United States Patent [19]

Sasaki

[11] Patent Number: 4,836,402

[45] Date of Patent: Jun. 6, 1989

[54] FUEL TANK VENT SYSTEM FOR AUTOMOTIVE VEHICLES

[75] Inventor: Michiaki Sasaki, Hadano, Japan

[73] Assignee: Nissan Motor Company, Limited, Yokohama, Japan

[21] Appl. No.: 220,969

[22] Filed: Jun. 14, 1988

Related U.S. Application Data

[63] Continuation of Ser. No. 883,248, Jul. 9, 1986, abandoned.

[51] Int. Cl.⁴ .............................................. B65D 25/00
[52] U.S. Cl. ........................... 220/85 VS; 220/85 VR
[58] Field of Search ............ 220/85 S, 85 VR, 85 VS, 220/DIG. 27; 137/587

[56] References Cited

U.S. PATENT DOCUMENTS

| | | | |
|---|---|---|---|
| 3,672,537 | 6/1972 | Kitzner | 220/85 VR |
| 3,915,184 | 10/1975 | Gallès | 220/85 VR X |
| 3,917,109 | 11/1975 | MacDonald | 220/85 VS |
| 4,166,550 | 9/1979 | Kleinschmit | 220/85 VS X |
| 4,457,443 | 7/1984 | Casimir et al. | 220/85 VS X |
| 4,531,653 | 7/1985 | Sakata | 220/85 VS X |

*Primary Examiner*—Steven M. Pollard
*Attorney, Agent, or Firm*—Foley & Lardner, Schwartz, Jeffery, Schwaab, Mack, Blumenthal & Evans

[57] ABSTRACT

A vent unit disposed in a vacant space of a fuel tank for venting fuel therefrom, consists of a separator having a separator chamber therewithin and a plurality of vent pipes in communication with the separator chamber. The fuel tank has a pair of opposite lateral walls and a corner at one end of one of the lateral walls. The separator has an orifice at the top wall thereof and is positioned adjacent the other of the lateral walls. One of the vent pipes extends away from the separator to terminate in a free end adjacent the aforementioned corner. The aforementioned one vent pipe slants downward as it extends away from the separator. Another vent pipe has an end outside of the fuel tank for connection with a canister or the like.

11 Claims, 5 Drawing Sheets

FUEL TANK VENT SYSTEM FOR AUTOMOTIVE VEHICLES

This application is a continuation, of application Ser. No. 883,248, filed July 9, 1986, now abandoned.

BACKGROUND OF THE INVENTION

1. Field of the Invention

The present invention relates in general to evaporative emission control systems for automotive vehicles and more particularly to a vent system for venting fuel vapor from a fuel tank of an automotive vehicle.

2. Description of the Prior Art

An increase of the pressure in a fuel tank due to vaporization of fuel is disadvantageous since it may adversely affect the supply of fuel to an associated engine, cause deformation of the fuel tank, or otherwise cause harm. In order to prevent this, prior practice has been to vent the fuel tank to an engine induction system by way of a canister so that the vapor in the fuel tank is drawn into the induction system for burning in a combustion chamber.

FIG. 10 shows a prior art fuel tank vent system including a fuel tank 20 having an upper vacant space S therewithin and a separator 21 disposed within the space S. The separator 21 has ports 22, 23 at the bottom wall and an upper part of the lateral wall thereof, respectively, and further has at the top wall thereof a vent pipe 24 projecting outside of the fuel tank 20. The vent pipe 24 is connected with a vent hose 25 in communciation with a canister (not shown) and is so arranged as to be higher in position than the surface of liquid fuel even when the vehicle turns a tight corner very rapidly or inclines greatly, with the fuel tank 20 being completely filled.

With the above arrangement, when the vehicle is on a horizontal road, to allow the surface of fuel in the fuel tank 20 to coincide with the solid line level in the drawing, fuel vapor flows into the separator 21 through the ports 22, 23 and is drawn through the vent pipe 24 outside of the fuel tank 20 and to the canister. When the vehicle inclines maximumly to the right or turns very rapidly to the left, the port 22 sinks under the surface of fuel represented by the one-dot chain line level (f) in the drawing. However, in this case, the port 23 and the inlet of the vent pipe 24 are positioned above the surface (f) of fuel. On the other hand, when the vehicle inclines maximumly to the left or turns very rapidly to the right, both ports 22, 23 sink under the surface of fuel represented by the one-dot chain line level (e) in the drawing. However, in this case, the inlet of the vent pipe 24 is positioned above the surface (e) of fuel. In the above manner, liquid fuel in the fuel tank 20 is prevented from flowing directly into the vent pipe 24. A structure similar to the above is disclosed in the Japanese Provisional Utility Model Publication No. 47-24496.

With the prior art vent system, while flow of liquid fuel directly into the vent pipe 24 can be prevented even when the vehicle inclines maximumly or turns very rapidly, it still can occur that liquid fuel flows out of the fuel tank 20 through the vent pipe 24 when the vehicle is parked for a long time and the ports 22, 23 remain below the surface of fuel, as, for example, when the surface of fuel coincides with the level (e). Under such a condition, the pressure in the fuel tank 20, namely, the pressure in the space S, increases with vaporization of fuel, forcing fuel to flow into the separator 21 and causing the surface of fuel therein to rise until fuel flows into the vent pipe 24. For this reason, it is necessary that separator 21 be as large as possible and be placed above the surface of fuel in the fuel tank 20 even when the fuel tank 20 is maximumly filled, resulting in the problem that such a separator inevitably reduces the effective volume of a fuel tank.

SUMMARY OF THE INVENTION

In accordance with the present invention, there is provided a novel and improved fuel tank vent system which comprises a fuel tank having a top wall and a vacant space between the top wall and the surface of fuel filled therein, the top wall having a pair of opposite first and second edges, the vacant space having a corner portion adjacent one longitudinal end of the first edge, a separator disposed in the vacant space adjacent the second edge and having a separator chamber, the separator having a top wall formed with an orifice for providing communicaton between the vacant space and the separator chamber, a first vent pipe in communication with the separator chamber and having an end outside of the fuel tank, and a second vent pipe disposed in the vacant space and in communication with the separator chamber, the second vent pipe having an end disposed adjacent the corner portion of the vacant space.

The above structure is quite effective for covercoming the above noted disadvantages and shortcomings inherent in the prior art device.

It is accordingly an object of the present invention to provide a novel and improved fuel tank vent system for a vehicle which can assuredly prevent outflow of fuel from a fuel tank without reducing the effective volume of the fuel tank.

It is another object of the present invention to provide a novel and improved fuel tank vent system of the above described character which allows a smaller separator to be used.

DETAILED DESCRIPTION OF THE PREFERRED EMBODIMENTS

Figure 1:
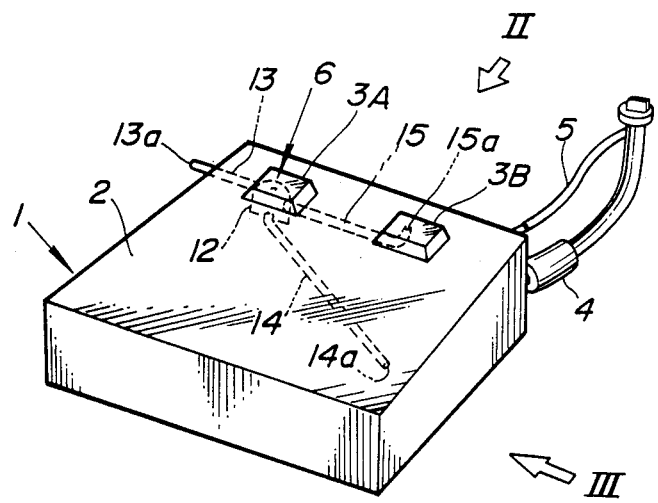
FIG. 1 is a schematic perspective view of a fuel tank vent system according to an embodiment of the present invention.
Figure 2:
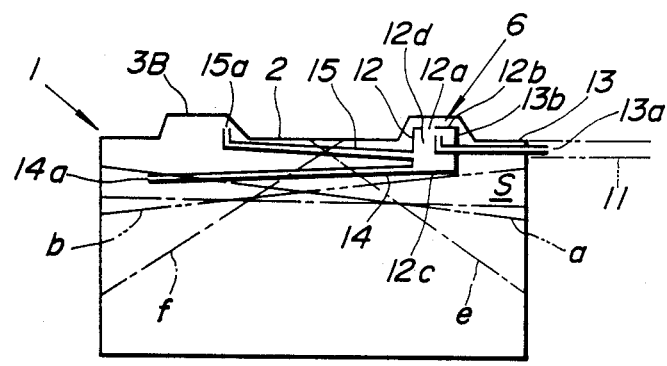
FIG. 2 is a schematic view taken in the direction of the arrow II of FIG. 1.
Figure 3:
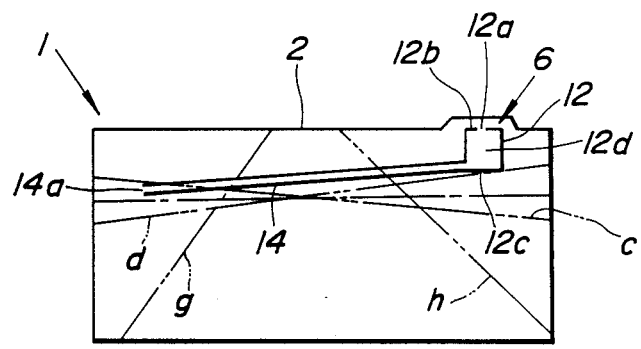
FIG. 3 is a schematic view taken in the direction of the arrow III of FIG. 1.

Referring to FIGS. 1 through 3, a fuel tank vent system according to an embodiment of the present invention includes a fuel tank 1 having at the top wall 2 thereof and adjacent one edge a pair of protuberances 3A, 3B. More specifically, the top wall 2 of the fuel tank 1 is rectangular and has a pair of corners at the opposite ends of one common edge or side, adjacent which corners the protuberances 3A, 3B are formed. The fuel tank 1 is adapted to have a vacant space S even when it is maximumly filled with fuel and in which vacant space S there is disposed a vent unit 6. The vent unit 6 consists of a separator 12 in the form of a receptacle such as a rounded one having a top wall 12b and a bottom wall 12c as shown and three vent pipes, namely, first, second and third vent pipes 13, 14, 15 attached to the circumferential or lateral wall of the separator 12 to communicate with the inside of same. The separator 12 has a separator chamber 12d therewithin and is disposed in one of the protuberances or more specifically, in such a manner as to be received at an upper part thereof in the protuberance 3A. Separator 12 has at the top wall 12b an orifice 12a providing communication between the separator chamber 12d and the inside of the protuberance 3A. The bottom wall 12c of the separator 12 is preferably flat and disposed horizontal when the vehicle is on a horizontal road, namely, when the fuel tank 1 is in its horizontal position. The third vent pipe 15 is attached to the separator 12 at a place slightly above the bottom wall 12c thereof and slants slightly upward as it extends from the separator 12 to terminate in a free end 15a which is received in the other protuberance 3B. The third vent pipe 15 is generally straight and bent upwardly at a place adjacent the free end 15a so that the free end 15a opens vertically upward to the inside of the other protuberance 3B. The first vent pipe 13 is adapted to project outside of the fuel tank 1 through one lateral wall and has, outside of the fuel tank 1, an outer end 13a to be connected to a hose 11 which is, in turn, to be connected to a carbon canister (not shown). First vent pipe 13 also projects into the separator chamber 12d to terminate in an inner end 13b received therein. The first vent pipe 13 is generally straight and bent upward at a place adjacent the inner end 13b so that the inner end 13b opens vertically upward into the separator chamber 12d. The second vent pipe 14 is attached to the separator 12 in such a manner as to extend continuously from the bottom wall 12c of the separator 12 and slant slightly downward as it extends away from the separator 12 to terminate in a free end 14a received in a corner portion of the vacant space S diagonally opposite to a corner portion adjacent which the separator 12 is placed. In this connection, the top wall 2 of the fuel tank 1 has a second edge opposite to the aforementioned edge, and the aforementioned corner portion of the vacant space S is positioned adjacent one longitudinal end of the second edge. In other words, the free end 14a of the second vent pipe 14 and the separator 12 are respectively positioned adjacent a pair of horizontally opposite sides or lateral walls of the fuel tank 1, which lateral walls are opposite in the front-to-rear direction of the vehicle. The second vent pipe 14 is generally straight. A filler tube 4 and a vent tube 5 are communicated with fuel tank 1.

The fuel tank vent system described as above operates as follows.

When the fuel tank 1 is in a horizontal state, the surface of the fuel therewithin coincides with the solid line horizontal level shown in FIGS. 2 and 3 and fuel vapor is drawn through the second and third vent pipes 14, 15 into the separator chamber 12d and to a carbon canister (not shown) through the first vent pipe 13 and the hose 11.

When the vehicle body inclines maximumly to the left, the free end 14a of the second vent pipe 14 sinks under the surface of fuel indicated by the two-dot chain line level (a) in FIG. 2. However, since the free end 15a of the first vent pipe 15 is positioned above the surface of fuel (a), good venting of fuel vapor from the fuel tank 1 is attained, similar to the case in which the fuel tank 1 is in a horizontal position. When the vehicle body returns to its horizontal position, the fuel which has flowed halfway into the second vent pipe 14 is forced to flow backward and is discharged therefrom since the second vent pipe 14 declines toward the free end 14a. On the other hand, when the vehicle body inclines maximumly to the right, both the free ends 14a, 15a of the second and third vent pipes 14, 15 are positioned above the surface of fuel represented by the two-dot chain line level (b) in FIG. 2, thus making it possible to attain good venting of fuel vapor from the fuel tank 1 similar to the case in which the fuel tank 1 is in its horizontal position.

When the vehicle body inclines maximumly forward, the free end 14a of the second vent pipe 14 sinks under the surface of fuel represented by the two-dot chain line level (c) in FIG. 3. However, since the third vent pipe 15 and the separator 12 are positioned above the surface of fuel (c), there are no obstacles to venting fuel vapor from the fuel tank 1. On the other hand, when the vehicle body inclines maximumly rearward, the free end 14a of the second vent pipe 14 is positioned above the surface of fuel represented by the two-dot chain line (d) in FIG. 3 and at the same time the free end 15a of the third vent pipe 15 and the separator 12 are positioned abovve the surface of the fuel (d). As a result, there are no obstacles to venting fuel vapor from the fuel tank 1.

When the vehicle turns very rapidly to the right, the free ends 14a, 15a of the second and third vent pipes 14, 15 sink under the surface of fuel represented by the one-dot chain line (e) in FIG. 2. However, since the separator 12 is above the surface of fuel (e) and since the orifice 12a provides communication between the separator chamber 12d and the vacant space S to minimize any pressure differential between the separator chamber 12d and the vacant space S, hardly any fuel flows into the separator chamber 12d. When the turning of the vehicle is finished, the fuel which has flowed halfway into the third vent pipe 15 flows into the the separator chamber 12d due to the inclination of the third vent pipe 15. However, the amount of fuel allowed to flow into the separator chamber 12d is small and the fuel which flows into the separator chamber 12d is discharged threfrom immediately since the second vent pipe 14 extends continuously from the bottom wall 12c of the separator 12 and slants downward as it extends away from the separator 12. The fuel which has flowed into the second vent pipe 14 is discharged therefrom prior to the above mentioned discharge of fuel from the separator 12. On the other hand, when the vehicle turns very rapidly to the left, both the free ends 14a, 15a of the second and third vent pipes 14, 15 are positioned above the surface of fuel represented by the one-dot chain line level (f) in FIG. 2. Due to this, the amount of fuel allowed to flow into the separator chamber 12d is smaller since fuel flows into the separator chamber 12d only through the orifice 12a. The fuel which has flowed into the separator chamber 12d is discharged therefrom immediately when the vehicle finishes turning.

When the vehicle starts very rapidly, the free end 15a of the third vent pipe 15 and the orifice 12a of the separator 12 sink under the surface of fuel represented by the two-dot chain line level (g) in FIG. 3. However, since the free end 14a of the second vent pipe 14 is positioned above the surface of fuel (g) and the submersion of free end 15a and orifice 12a continues only for a moment, the amount of fuel flowing into the separator chamber 12d is quite small, and the venting of fuel vapor from the fuel tank 1 is not obstructed. On the other hand, when the vehicle is stopped very rapidly, the free end 14a of the second vent pipe 14 sinks under the surface of fuel represented by the two-dot chain line level (h). However, since the separator 12 is positioned above the surface of fuel (h), fuel does not flow into the separator 12 at all.

Figure 4:
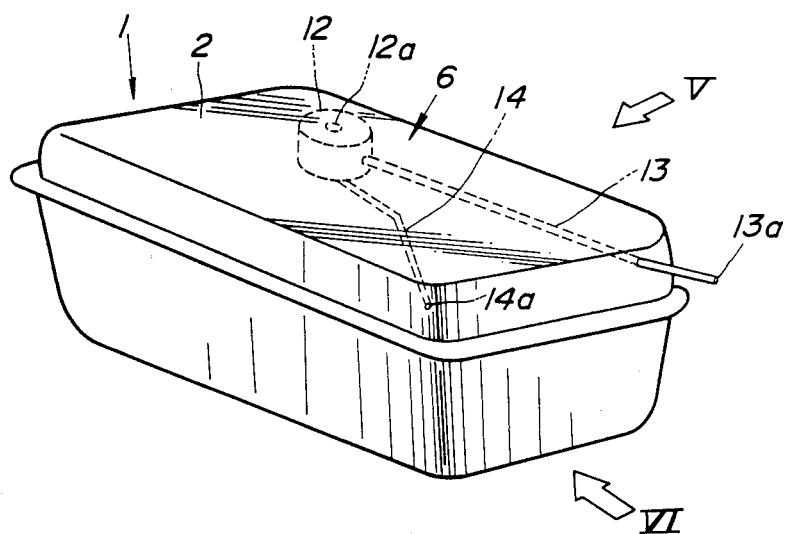
FIG. 4 is a schematic perspective view of another embodiment of the present invention.
Figure 5:
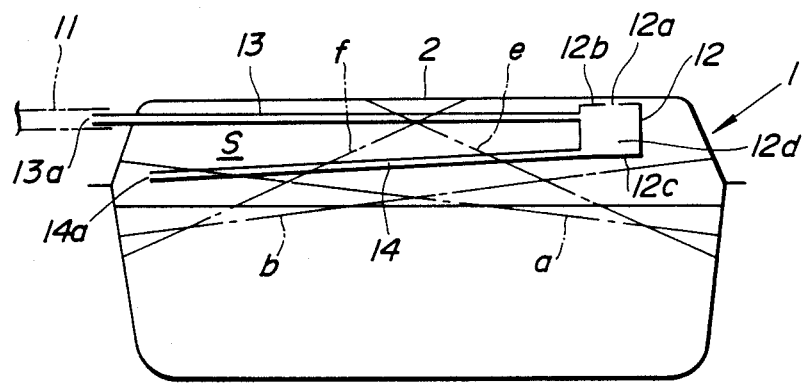
FIG. 5 is a schematic view taken in the direction of the arrow V of FIG. 4.
Figure 6:
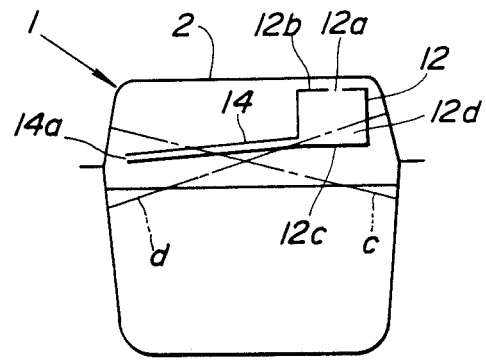
FIG. 6 is a schematic view taken in the direction of the arrow IV of FIG. 4.

Another embodiment of the present invention is shown in FIGS. 4 to 6 in which parts and portions identical or corresponding to those of the previous embodiment are designated by like reference numerals. This embodiment differs from the previous embodiment in that the top wall 2 of the fuel tank 1 is planar without any protuberances and the vent unit 6 includes only two vent pipes, namely, a first vent pipe 13 and a second vent pipe 14. Except for the above, this embodiment is substantially similar to the previous embodiment and can produce substantially the same effect.

Figure 7:
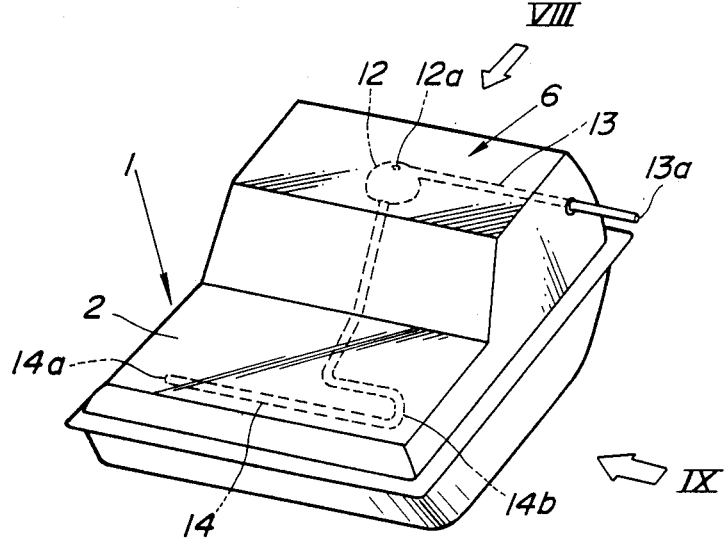
FIG. 7 is a schematic perspective view of a further embodiment of the present invention.
Figure 8:
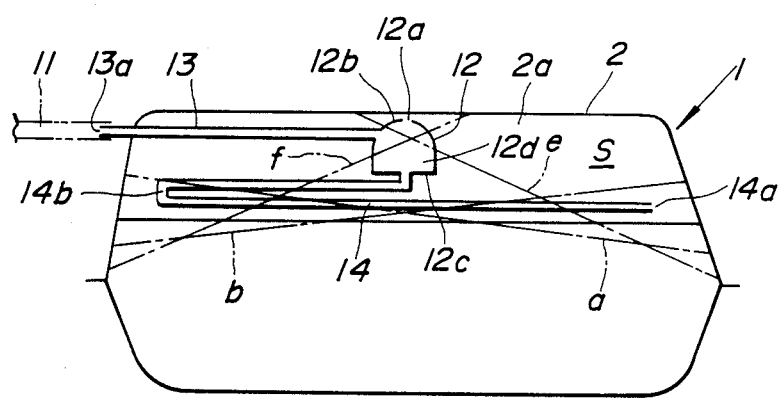
FIG. 8 is a schematic view taken in the direction of the arrow VIII of FIG. 7.
Figure 9:
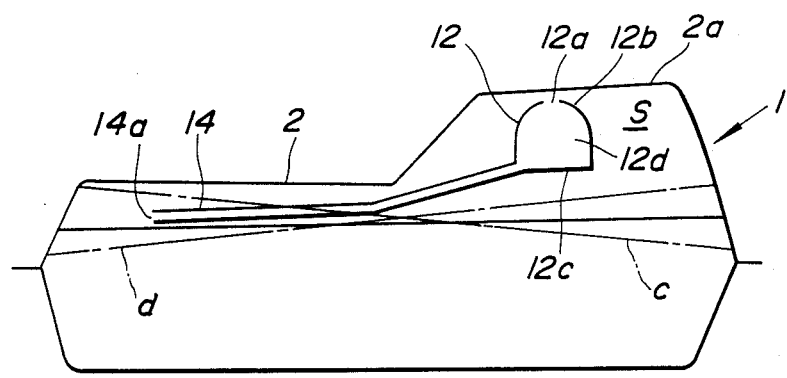
FIG. 9 is a schematic view taken in the direction of the arrow IX of FIG. 7.
Figure 10:
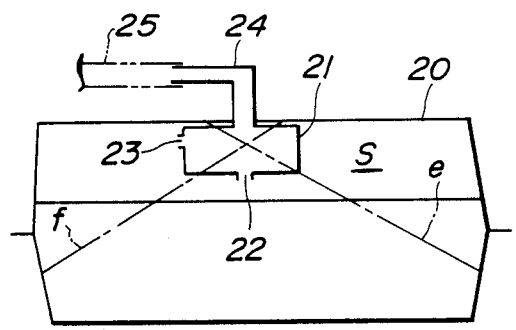
FIG. 10 is a schematic view of a prior art fuel tank vent system.

A further embodiment of the present invention is shown in FIGS. 7 to 9 in which parts and portions identical or corresponding to those of the previous embodiment of FIGS. 1 to 3 are designated by like reference numerals. In this embodiment, the top wall 2 of the fuel tank 1 has a bulged rear half portion 2a. The separator 12 is disposed within the bulged rear half portion 2a and intermediate between the lateral ends of same (i.e. the ends opposed in the lateral direction of the vehicle). The vent unit 6 includes two vent pipes, namely, a first vent pipe 13 and a second vent pipe 14. The second vent pipe 14 extends away from the separator 12 toward one of a first pair of corner portions of the fuel tank 1 from which the separator 12 is more remote than a second pair of corner portions. The second vent pipe 14 is bent at a place 14b adjacent one of the first pair of corner portions and extends toward the other of the first pair of corner portions to terminate in a free end 15a adjacent the same.

Except for the above, this embodiment is substantially similar to the previous embodiment of FIGS. 1 to 3 and can produce substantially the same effect. In addition, when the vehicle turns very rapidly to the left, the free end 14a of the second vent pipe 14 sinks under the surface of fuel represented by one-dot chain line level (f) in FIG. 8. However, since the bent portion 14b of the second vent pipe 14 is positioned above the surface of fuel (f), flow of fuel into the second vent pipe 14 is limited to the portion extending between the first pair of corner portions of the fuel tank 1, thus assuredly preventing fuel from flowing into the separator chamber 12d.

From the foregoing, it is to be understood that flow of fuel into the separator is assuredly prevented even when the vehicle inclines maximumly or turns very rapidly, thus making it possible to assuredly prevent outflow of fuel from the fuel tank and keep the fuel tank well vented at any times.

It is further to be understood that due to the provision of the vent pipes the separator can be smaller in size than before, thus making it possible to reduce the space necessary for the disposition of the vent unit in the fuel tank for thereby increasing the effective volume of the fuel tank.

What is claimed:

1. A fuel tank vent system for a vehicle comprising:
   a rectangular fuel tank having a first pair of horizontally opposite sides and a second pair of horizontally opposite sides, said fuel tank also having a top wall and a vacant space between said top wall and the surface of fuel filled therein, said top wall having a pair of opposite first and second edges coinciding with said first pair of sides, said vacant space having a first corner portion adjacent one longitudinal end of said first edge and a second corner portion adjacent one longitudinal end of said second edge and diagonally opposite to said first corner portion;
   a separator disposed in said vacant space adjacent said second edge and said second corner portion, said separator having a separator chamber, said separator having a top wall and a bottom wall, said top wall being formed with an orifice for providing communication between said vacant space and said separator chamber;
   a first vent pipe in communication with said separator chamber at a portion adjacent said top wall and having an end outside of said fuel tank; and
   a second vent pipe disposed in said vacant space and in communication with said separator chamber at a portion adjacent said bottom wall, said second vent pipe having an end disposed adjacent said first corner portion of said vacant space whereby said second vent pipe extends diagonally between said first corner and said second corner portion.

2. A fuel tank vent system as set forth in claim 1 wherein said separator has a bottom wall opposite to said top wall, said second vent pipe extending continuously from said bottom wall of said separator in such a manner as to slant downward as it extends away from said separator.

3. A fuel tank vent system as set forth in claim 2 wherein said first vent pipe opens to said separator chamber at a place adjacent said top wall of said separator.

4. A fuel tank vent system as set forth in claim 3 wherein said separator is positioned intermediate between said second pair of sides of said fuel tank.

5. A fuel tank vent system as forth in claim 4 wherein said top wall of said fuel tank has a bulged half portion in which said separator is disposed.

6. A fuel tank vent system for a vehicle comprising:
   a fuel tank having a top wall and a vacant space between said top wall and the surface of fuel filled therein, said top wall having a pair of opposite first and second edges, said vacant space having a first corner portion adjacent one longitudinal end of said first edge and a second corner portion adjacent one longitudinal end of said second edge and diagonally opposing said first corner portion;
   a separator disposed in said vacant space adjacent said second edge and adjacent said second corner portion, said separator having a separator chamber, said separator having a top wall formed with an orifice for providing communication between said vacant space and said separator chamber, said separator being positioned adjacent said second corner portion;

a first vent pipe in communication with said separator chamber and having an end outside of said fuel tank;

a second vent pipe disposed in said vacant space and in communication with said separator chamber, said second vent pipe having an end disposed adjacent said first corner portion of said vacant space whereby said second vent pipe extends diagonally between said first corner portion and said second corner portion;

a third vent pipe disposed in said vacant space and in communication with said separator chamber; and said top wall of said fuel tank being formed with a pair of protuberances adjacent said second edge and spaced in the longitudinal direction of same, said separator being received in one of said protuberances, said third vent pipe having an end attached to said separator and the other end disposed in said other protuberance.

7. A fuel tank vent system as set forth in claim 6 wherein said third vent pipe is generally straight and slants upward as it extends away from said separator.

8. A fuel tank vent system as set forth in claim 7 wherein said third vent pipe is bent upward adjacent said other end so as to open vertically upward into said other protuberance.

9. A fuel tank vent system as set forth in claim 8 wherein said first vent pipe has the other end disposed in said separator chamber and is bent upward at a place adjacent said other end so as to open vertically upward into said separator chamber.

10. A fuel tank vent system as set forth in claim 9 wherein wherein said first pair of sides of said fuel tank is so arranged as to oppose in the front-to-rear direction of the vehicle.

11. A fuel tank vent system for a vehicle comprising:

a fuel tank having a top wall and a vacant space between said top wall and the surface of fuel filled therein, said top wall having a pair of first and second edges, said vacant space having a first corner portion adjacent one longitudinal end of said first edge and a second corner portion adjacent one longitudinal end of said second edge and diagonally opposing said first corner portion;

a separator disposed in said vacant space adjacent said second edge and adjacent said second corner portion, said separator having a separator chamber, said top wall of said fuel tank being formed with a pair of protuberances adjacent said second edge and spaced in the longitudinal direction of same; and a plurality of vent pipe means for providing communication with said separator chamber, one of said vent pipe means having an end outside of said first tank, others of said vent pipe means being in said vacant space, one of said others having an end disposed adjacent said first corner portion of said vacant space thereby extending diagonally between said first and second corner portions, and another of said others having one end attached to said separator and another end disposed in said other protuberance.

* * * * *